(12) United States Patent
Ciesluk (10) Patent No.: US 12,057,697 B2
(45) Date of Patent: Aug. 6, 2024

(54) ADAPTIVE POWER SUPPLY VOLTAGE TRANSIENT PROTECTION

(71) Applicant: Blaize, Inc., El Dorado Hills, CA (US)

(72) Inventor: Sebastian Artur Ciesluk, Leeds (GB)

(73) Assignee: Blaize, Inc., El Dorado Hills, CA (US)

( * ) Notice: Subject to any disclaimer, the term of this patent is extended or adjusted under 35 U.S.C. 154(b) by 458 days.

(21) Appl. No.: 17/544,087

(22) Filed: Dec. 7, 2021

(65) Prior Publication Data

US 2023/0178979 A1     Jun. 8, 2023

(51) Int. Cl.
*H02H 9/04* (2006.01)
*H02H 1/00* (2006.01)
*H02H 9/00* (2006.01)

(52) U.S. Cl.
CPC ............ *H02H 9/04* (2013.01); *H02H 1/0007* (2013.01); *H02H 9/005* (2013.01)

(58) Field of Classification Search
CPC .......... H02H 9/005; H02H 3/24; H02H 3/243; G06F 1/305
See application file for complete search history.

(56) References Cited

U.S. PATENT DOCUMENTS

| | | | |
|---|---|---|---|
| 5,448,155 A | 9/1995 | Jutras | |
| 5,559,656 A | 9/1996 | Chokhawala | |
| 6,040,639 A | 3/2000 | Ginell | |
| 7,592,789 B2 | 9/2009 | Jain | |
| 9,018,931 B2 | 4/2015 | Bridge et al. | |
| 2018/0183417 A1* | 6/2018 | Ho | H03K 5/05 |
| 2022/0006287 A1* | 1/2022 | Bemat | G06F 1/266 |
| 2023/0155373 A1* | 5/2023 | Handy | H03K 17/122 |
| | | | 323/282 |

* cited by examiner

*Primary Examiner* — Jared Fureman
*Assistant Examiner* — Christopher J Clark
(74) *Attorney, Agent, or Firm* — Brian R. Short (57) ABSTRACT

Methods, systems, and apparatuses for adaptive power supply voltage transient protection are disclosed. One system includes a system on a chip (SOC), wherein the SOC includes a power supply, a voltage transient sensor, and a power control processing entity. The power supply operates to provide power to one or more processors operating on the SOC. The voltage transient sensor is connected to the power supply and operates to sense voltage transients on the power supply at greater than a predetermined speed or rate. The power control processing entity operates to receive a digital representation of the sensed voltage transients and adjust a power load of the SOC based on the sensed voltage transients.

20 Claims, 7 Drawing Sheets

ADAPTIVE POWER SUPPLY VOLTAGE TRANSIENT PROTECTION

FIELD OF THE EMBODIMENTS

The described embodiments relate generally to power supply control. More particularly, the described embodiments relate to methods, apparatuses, and systems for adaptive power supply voltage transient protection.

BACKGROUND

Ideally, a well-designed computing system does not exhibit power supply voltage transients bigger than predicted during the design of the computing system.

It is desirable to have a method, apparatus, and system for adaptive power supply voltage transient protection.

SUMMARY

One embodiment includes a system on a chip (SOC). The SOC includes a power supply, a voltage transient sensor, and a power control processing entity. The power supply operates to provide power to one or more processors operating on the SOC. The voltage transient sensor is connected to the power supply and operates to sense voltage transients on the power supply at greater than a predetermined speed or rate. The power control processing entity operates to receive a digital representation of the sensed voltage transients and adjust a power load of the SOC based on the sensed voltage transients.

Another embodiment includes a method. The method includes providing, by a power supply, power to one or more processors operating on a system on a chip (SOC), sensing, by a voltage transient sensor connected to the power supply, voltage transients on the power supply at greater than a predetermined speed or rate, receiving, by a power control processor, a digital representation of the sensed voltage transients, and adjusting, by a power control processor, a power load of the SOC based on the sensed voltage transients.

Other aspects and advantages of the described embodiments will become apparent from the following detailed description, taken in conjunction with the accompanying drawings, illustrating by way of example the principles of the described embodiments.

DETAILED DESCRIPTION

The described embodiments are embodied in methods, apparatuses, and systems for adaptive power supply voltage transient protection. The voltage transient can include a fast change of voltage or current. At least some embodiments include scaling (adjusting) SOC (system on a chip) processing power based on voltage monitoring of its main power rail (output of power supply) to prevent uncontrolled voltage transients potentially triggering current limits on power regulators or pushing the SOC out of safe operating voltage. For an embodiment, the SOC system does not exhibit power supply voltage transients bigger than assumed during a design process of the SOC. In addition, dynamic frequency scaling can be provided for constraining the total power consumption for thermal purposes. The term "power regulator" is used here to describe an electronic circuit designed to provide constant voltage (independent of load current) to the load, wherein the load may include a processor. The power regulator may also be referred to as a power supply or a power converter.

Artificial intelligence (AI) processing can place unique demands on power supplies of processors of the AI processing. At least some of the described embodiments help with providing power to power hungry AI (or other) processors. The problem with providing power to AI processors is related to the fact that power regulators designed for certain classes of processing might be not sufficient for other sometimes not yet characterized algorithms. Further, since AI processing quite often consists of very high-power processing lasting several microseconds and gaps in the processing (or lower processing periods) lasting another several microseconds, such a processing periods can build up power demand exceeding designed power regulator capability.

A simple solution for providing a power regulator capable of supplying enough power for the worst-case situations is quite often impractical or impossible due to lack of final data or other factors. Also, the nature of the data processed by an algorithm might change, and a perfectly working design might become unreliable due to excessive power demand.

At least some of the described embodiments provide power control based on sensed voltage transients. An approach for power regulation of the delivery of power to a load that, includes a sudden load application (when AI or other processing starts or increases) demands large power delivery immediately. The immediate large power demand may not be provided by an on-board power regulator because of the speed of a regulating loop of the power regulator and due to parasitics (most likely inductance) of a power delivery network. Instead, power is delivered from decoupling capacitors placed close to the load. Ideally power provided by decoupling capacitors should last until the power regulator "keeps up" and starts delivering higher power. For cases where power delivered from the power regulator is not enough the voltage at the load drops.

At least some of the described embodiments include sampling voltage drops of Vout of a power supply to a processor and scaling the processing of the processor accordingly. Current consumption can be greatly reduced and/or distributed over longer periods of time allowing savings of costs of a PDN (power delivery network) or regulator design as well as allowing the processing of demanding algorithms which normally push operating circuits into forbidden areas of high-power consumption.

The described embodiments can be used in several scenarios. For example, due to optimizations (or development of new algorithms) AI algorithms operating on a processor are becoming capable of creating excessive transient power not initially predicted for the processor. Hence, capabilities of the power regulator can be exceeded. Further, for example, the design of power regulator and PDN (power distribution networks) are initially scaled to certain levels as dictated by economic reasons or other factors, but advanced AI algorithms need to be run on processors powered by the power regulator and PDN with scaled down processing. Further, for example, due to critical safety requirements, regardless of the processing algorithm, the system (processor) cannot go to overcurrent or shutdown mode even for algorithms where power consumption cannot be reliable predicted. In all three cases the proposed mechanism allows all algorithms to be safely run even on hardware not designed for most advanced optimizations.

Figure 1:
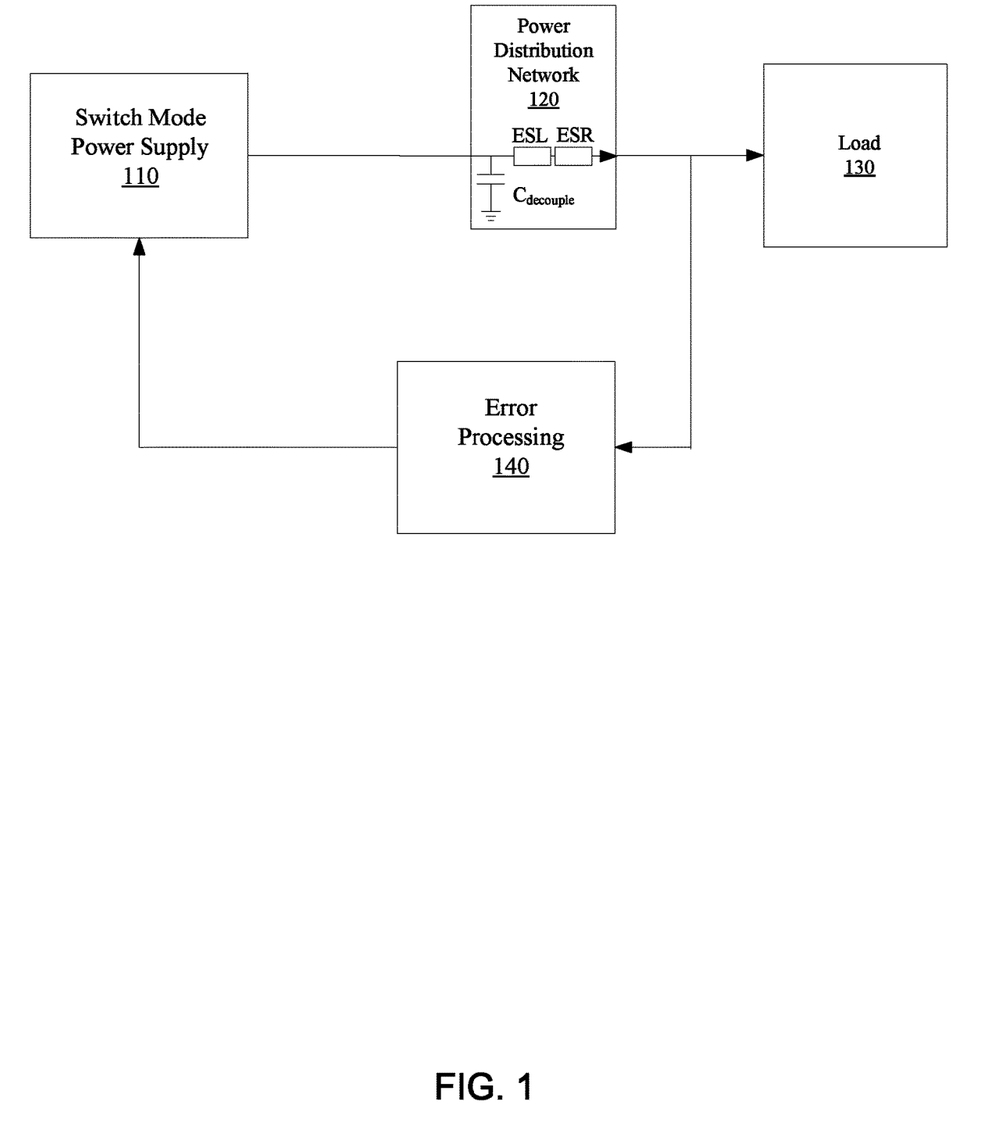
FIG. 1 shows an embodiment of a system for providing a regulated voltage to a processor (load) that includes a power regulator with a feedback signal driving an error processing entity, which creates an error signal used to adjust the output voltage of the power regulator, according to an embodiment.

FIG. 1 shows an embodiment of a system for providing a regulated voltage to a processor (load) that includes a power regulator 110 with a feedback signal driving an error processing entity 140, which creates an error signal used to adjust the output voltage of the power regulator 110, according to an embodiment. For an embodiment, a regulated voltage is provided to a processor 130 (load) by the power regulator 110 (typically switch mode power regulator) with the feedback signal driving the error processing entity 140, which creates an error signal used to adjust the output voltage of the power regulator 110.

FIG. 1 shows a decoupling capacitor ($C_{decouple}$). Decoupling Capacitors are capacitors connected between power line and ground. For an embodiment, the decoupling capacitor is located physically between an output (providing voltage for the load) and the load of the voltage regulator. For an embodiment, the decoupling capacitor is used for providing energy for fast load changes that the power regulator is not capable of providing due to its slow speed (comparing to load changes). A capacitor by its nature prevents (opposes) quick voltage changes, what keeps voltage stable when high current is suddenly demanded by the regulator.

FIG. 1 additionally shows an ESL (Equivalent series inductance), and an ESR (Equivalent series resistance). The ESL is a parasitic inductance of an electronic element (capacitor or resistor). The ESR is a parasitic resistance of and electronic element (inductor or capacitor)

For an embodiment, a "control scheme" is defined which describes what type of feedback signal is used and how the error processing is done as well as how the error signal affects the switching of the power regulator 110. It is to be noted that error signal represents characteristics of the voltage on the load and is used for regulator feedback not for scaling processing power of the processor of the load 130. Depending on the type of the feedback signal and the way the error processing is done, several control schemes are possible. Such control schemes include, for example, voltage control, current control, and/or constant on time.

A PDN (power delivery network) 120 of FIG. 1 provides a connection between the power regulator 110 and load 130 (printed circuit board traces with printed circuit board resistance and inductance) as well as decoupling capacitors ($C_{decouple}$). The decoupling capacitors ($C_{decouple}$) serve as reservoirs of charge keeping some energy needed to cover sudden demand from the load-transients. The term PDN may include printed circuit board traces/planes, with their parasitic parameters of resistance (ESR), inductance (ESL), and capacitance.

Figure 2:
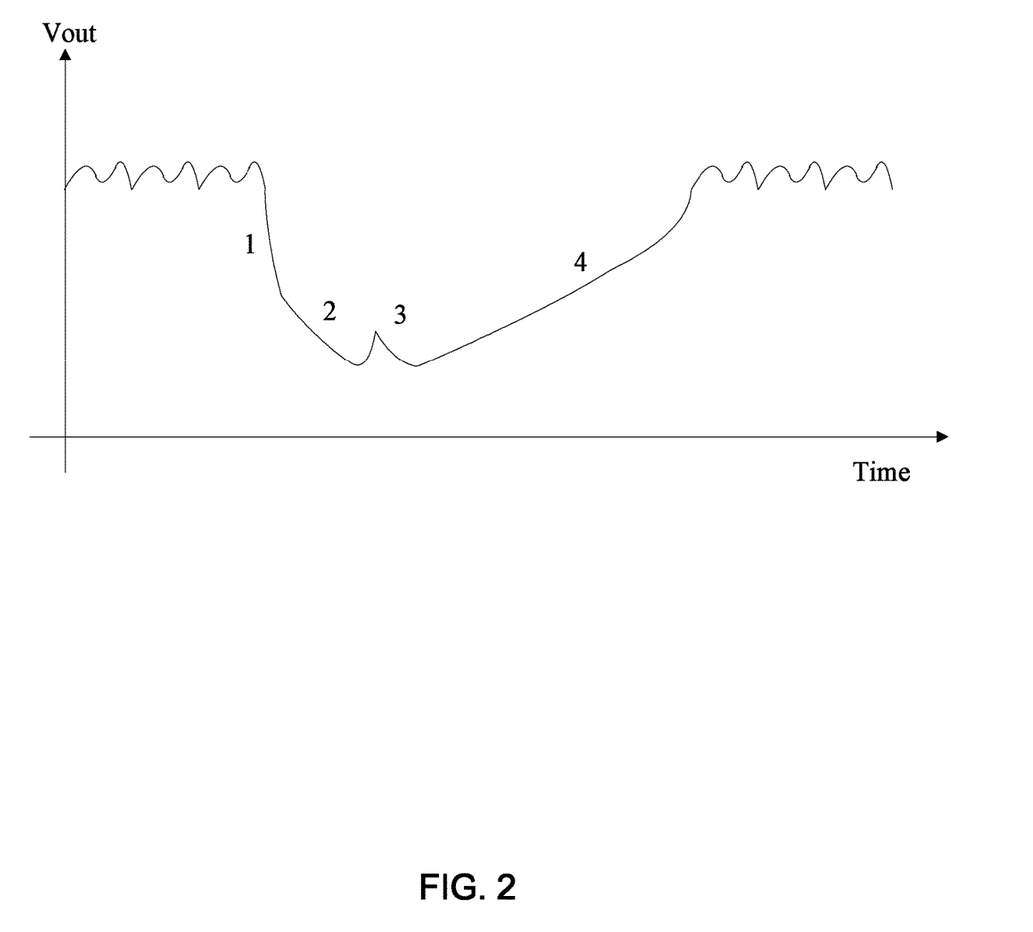
FIG. 2 is a time-line of a voltage $V_{out}$ at a load of FIG. 1, according to an embodiment.

FIG. 2 is a time-line of a voltage ($V_{out}$) at a load of FIG. 1, according to an embodiment. Specifically, the time-line of FIG. 2 shows the voltage at the load 130 in the moment of the start of processing by the load (for example, an AI processor). Additional power is needed at the start of processing which is manifested at the load by a drop of the supply voltage.

As shown in FIG. 2, the voltage includes four regions 1, 2, 3, 4. Region 1 of the voltage dip is related to the ESL of decoupling capacitance and the load slew rate. The slew rate is the change of voltage or current, or any other electrical quantity, per unit of time. A faster slew rate yields a larger ESL spike. Region 2 is the voltage drop proportional to the step size multiplied by the ESR. During this time, inductor current (current of power regulator) begins to slew upwards in response to the step. Region 3 $V_{OUT}$ continues to dip as decoupling capacitance is further discharged while trying to hold the voltage at $V_{OUT}$(NOM). Adding additional capacitance dictates this portion of the response. At the inflection point between region 3 and 4 the inductor current matches the value of the load current. As the current overshoots the new $V_{OUT}$ rises back to $V_{OUT}$(NOM). Regulation is better the faster region 4 is reached.

Various control schemes and regulators provide various speeds of regulations related to the time needed for Error Processing and the frequency of switch mode power regulator.

In the case in which the load requires current greater than the power regulator can provide, several situations can happen. First, a power regulator shutdown due to an overcurrent or an overtemperature can occur. Second, voltage starvation can occur if the power regulator does not provide a protection mechanism or the protection mechanism takes long time to start. Third, an uncontrolled increase of temperature and potential failure to the board can occur if the power regulator is designed with no protection. All three cases can be fatal to the system causing sudden shutdowns, unpredictability and in worst case fire. At least some of the described embodiments address all three of these potential problems.

In some solutions the processing power (computational power) of the SOC is scaled by means of varying frequency of the main clock (DFS Dynamic Frequency Scaling) (or parameters of algorithms being run) basing on either a statically predicted load of the SOC needed for certain class of algorithms operating on the SOC, or a measured average power of a main power rail of the SOC. DFS (Dynamic Frequency Scaling) is a technique used to lower the processing power hence current consumption of a processor by slowing down the frequency of the main processor clock. A problem of these approaches is that, predictions of total power consumed by the SOC are not very reliable and optimizations in software algorithms can change the current demand profile rapidly. Situations can occur in which a perfectly designed power supply system shows dangerous voltage transients which can trigger power protections of regulators of the SOC or push the SOC out of safe operating voltage.

Figure 3:
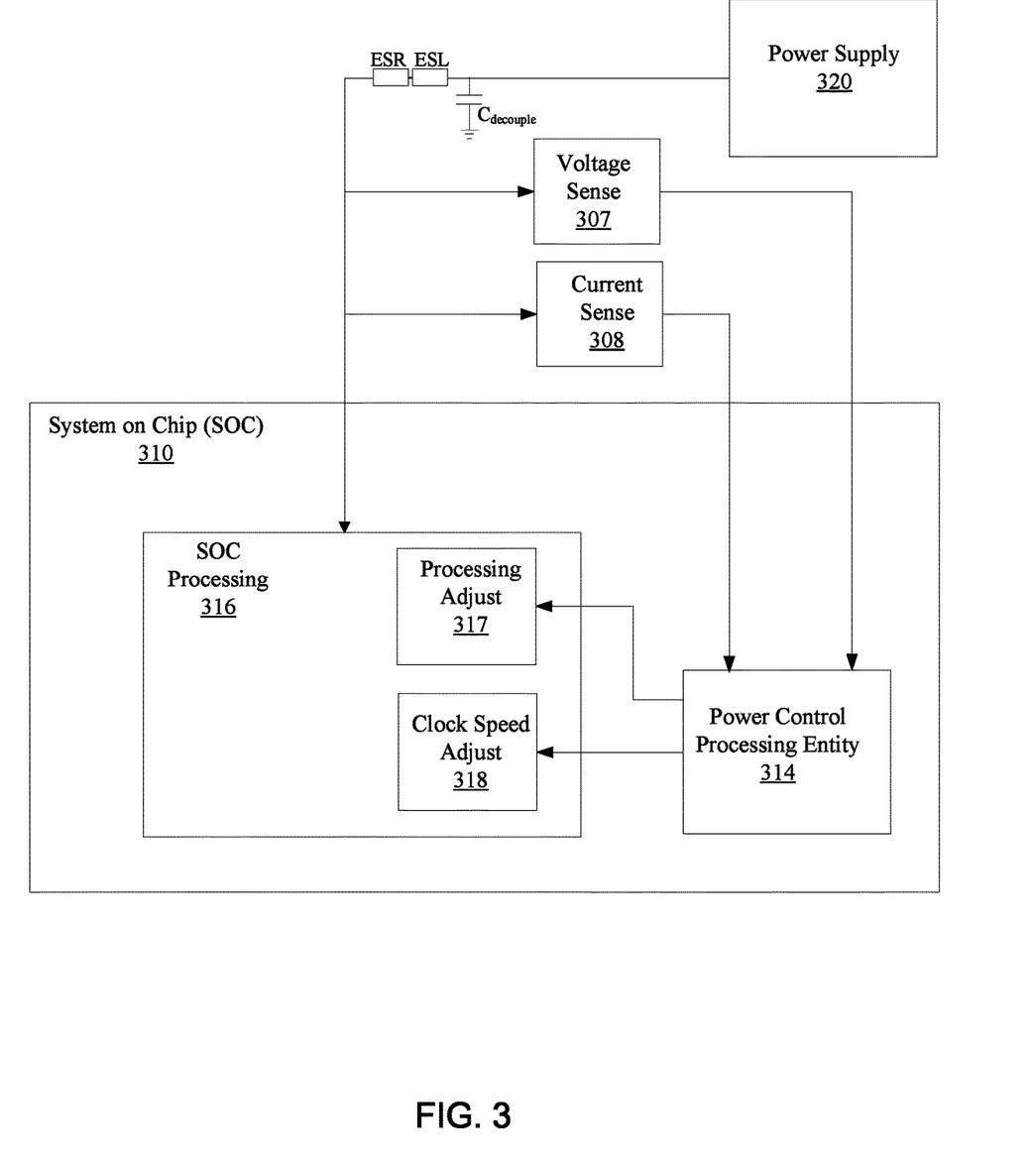
FIG. 3 shows a system for sensing power of a system on a chip (SOC), according to an embodiment.

FIG. 3 shows a system for sensing power of a system on a chip (SOC) 310, according to an embodiment. The SOC 310 receives electrical power from a power supply 320. A voltage sensor 307 and a current sensor 308 operate to sense the power consumed by the SOC 310. A power control processor 314 receives the sensed voltage of the voltage sensor 307 and the sensed current of the current sensor 308. Based on the sensed power, a power control processing entity 314 adjusts power consumed by the SOC 310.

For an embodiment, the power control processing entity 314 adjusts the power consumed by the SOC 110 by at least a processing adjustment 317 or a clock speed adjustment 318 (also referred to as frequency scaling) of SOC processing 316. For an embodiment, the processing adjustment can include adjusting the level of processing of algorithms operating on the SOC to reduce power consumption. For an embodiment, the clock speed adjustment includes altering the clock frequency (frequency scaling) to adjust the power consumption.

For the system of FIG. 3, the total power of the SOC is computed based on voltage and current signals delivered in digital form by the voltage sensor 307 and the current sensor 308. However, measuring power on a main supply rail of the SOC of FIG. 1 poses challenges. For power measurement both the voltage and the current of the power rail needs to be monitored. While voltage is relatively easy to monitor at the SOC pins or even on the die of the SOC, the current monitoring cannot be easily realized as the current needs to be measured on a shunt resistance or using magnetic sensors (such as Hall sensor). However, both of these methods of sensing current seriously affect impedance of the power plane which should be lowest for achieving best power integrity.

Figure 4A:
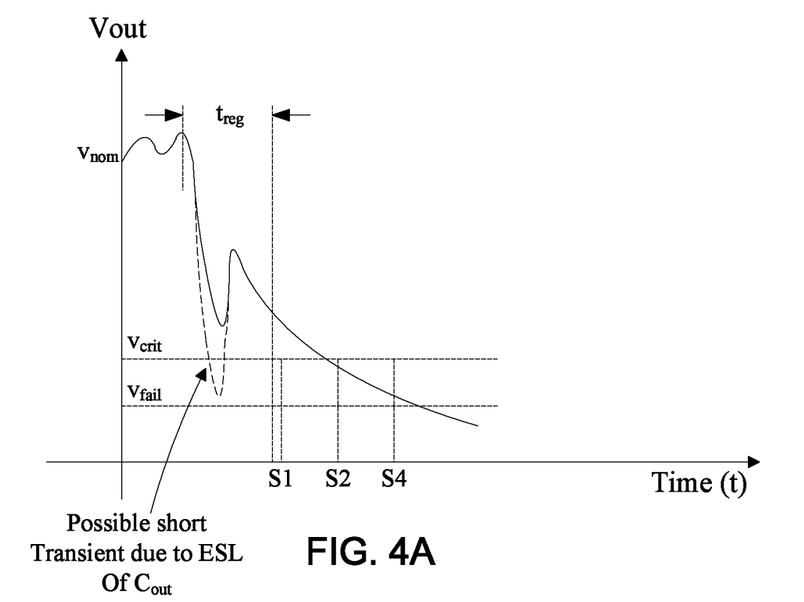
FIG. 4A shows a time-line of a voltage waveform of ($V_{out}$) for a situation in which a power regulator cannot keep up with current demand of a load, according to an embodiment.

FIG. 4A shows a time-line of a voltage waveform of ($V_{out}$) for a situation in which a power regulator cannot keep up with current demand of a load, according to an embodiment. Without a means for voltage protection, the voltage will drop even further.

The time $t_{reg}$ on the voltage waveform is the time regulator should be able to provide enough current to equalize current demand of the load.

At least some embodiments include periodical sampling of the voltage by the proposed circuit (for clarity of picture only 3 samples are shown S1, S2, S3). Having establish $V_{crit}$, as the voltage threshold indicating that power regulator will not be able to keep up with the transient, several samples are monitored to determine if the voltage samples are below the $V_{crit}$. If so load in the SOC or an AI processor needs to be adjusted to lower the current consumption.

AI processing is quite often realized in batches. Therefore, it might be the case that only certain batches of data need to be slowed down in order for the power regulator to replenish all power needed by decoupling capacitors for sustaining regulated voltage.

In most critical situations the processing can be paused until the voltage returns, with certain hysteresis, to the safe levels, and then processing continues. The rationale for such an action is to keep the system operational with limited processing as opposed to a shutdown or unpredicted behavior.

It is important to choose the sampling frequency as well as number of samples needed for the decision on load scaling to ensure that the regulated voltage will not fall below $V_{fail}$, which is a voltage where operation of the system is no longer guaranteed. A voltage transient that falls below $V_{fail}$ is so extreme that even if the power drawn by the load (SOC) is reduced to a minimum (taking onto account time it takes to scale the power), the operation of the SOC is not guaranteed.

The choice of $V_{crit}$, and $V_{fail}$ as well as frequency of sampling and number of samples shall be established per circuit taking into account capabilities of the system, quality of the PDN, speed of power regulator and reaction time of over current protection of the regulator.

It should be noted that the waveform of FIG. 4A shows one load spike, while in reality several load pulses or spikes can happen in a very small proximity of time causing their effect to add up in a way that while single load spike is absolutely within design limits several of them add up in a way which triggers the proposed embodiment for voltage protection.

It is important to establish right number of samples needed to activate the embodiment for voltage protection as, what is shown by the dashed line of FIG. 4A (possible short transient), very short inductive transients are allowed due to nature of ESL of a decoupling capacitance, and the embodiment for voltage protection should not be activated on such transients.

There is a risk that choosing the $V_{crit}$ higher than minimum voltage requested by the load tolerance range, a portion of voltage range normally given to voltage regulator as "still safe area" will be lost for the proposed embodiment for voltage protection, but this is the price for safety and reliability gained by using the proposed embodiment for voltage protection.

Choosing sampling frequency as high as possible allows bringing $V_{crit}$ as close to tolerance of the load so the area of safe operating margin used for the proposed embodiment for voltage protection does not affect much the tolerance of voltage regulation for a given power regulator. For at least some embodiments, the sampling frequency is faster than the reaction time of the regulator. Processing of the request to lower the power consumption of the SOC/processor is done with maximum processor speed to further reduce reaction time.

An application of the described embodiments for voltage protection includes designing AI processing in batches and invalidating certain amounts of recently processed batches if voltage quality is below $V_{crit}$ knowing that the system allows processing below $V_{crit}$ but for safety, data might be less reliable.

Another application of the described embodiments for voltage protection includes pre-training of an algorithm to be used in the form of running representative processing batch, monitoring the voltage transients, and observing if $V_{crit}$ is exceeded. If transients are larger than $V_{crit}$ then certain power limiting modifications to the algorithm can be applied (for example frequency of the clock can be scaled down) and another run of test batch can be executed again observing the transients below $V_{crit}$. For an embodiment, this is repeated until safe power parameters of an algorithm are found, and the real processing can start knowing that algorithm will be safely run due to right power scaling for this exact hardware configuration (power regulator, PDN, load) without triggering the embodiment for voltage protection which still can be enabled either as another safety level or for monitoring.

Figure 4B:
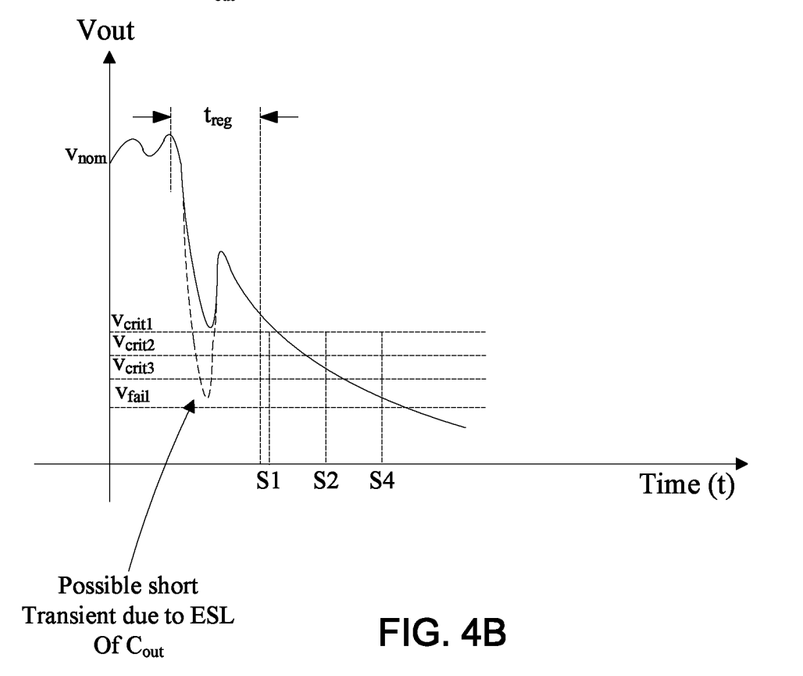
FIG. 4B shows a time-line of a voltage waveform of ($V_{out}$) for a situation in which a power regulator cannot keep up with current demand of a load, according to another embodiment.

FIG. 4B shows a time-line of a voltage waveform of ($V_{out}$) for a situation in which a power regulator cannot keep up with current demand of a load, according to another embodiment. As shown in FIG. 4B, multiple levels of critical voltages ($V_{crit1}$, $V_{crit2}$, $V_{crit3}$) are indicated. For an embodiment, detection of the voltage waveform of ($V_{out}$) dropping below each of the multiple levels of critical voltages ($V_{crit1}$, $V_{crit2}$, $V_{crit3}$) provides adaptive control of adjustment of the power consumed by the SOC. That is, for example, if the voltage waveform of ($V_{out}$) is detected to drop below $V_{crit}$ below but not below $V_{crit2}$, then the power control processing entity controls the power load of the SOC through reduced processing or reduced clock frequency to reduce the load by X percent. Further, if the voltage waveform of ($V_{out}$) is detected to drop below $V_{crit2}$ but not below $V_{crit3}$, then the power control processing entity controls the power load of the SOC through reduced processing or reduced clock frequency to reduce the load by Y percent. Further, if the voltage waveform of ($V_{out}$) is detected to drop below $V_{crit3}$ but not below $V_{fail}$, then the power control processing entity controls the power load of the SOC through reduced processing or reduced clock frequency to reduce the load by Z percent. The power reduction of Z percent causes the power load to be less than the power reduction of Y percent, and the power reduction of Y percent causes the power load to be less than the power reduction of X percent. That is, for an embodiment, the power load of the SOC is adaptively adjusted based on the detected level of the sensed transients of the voltage waveform of ($V_{out}$).

Figure 5:
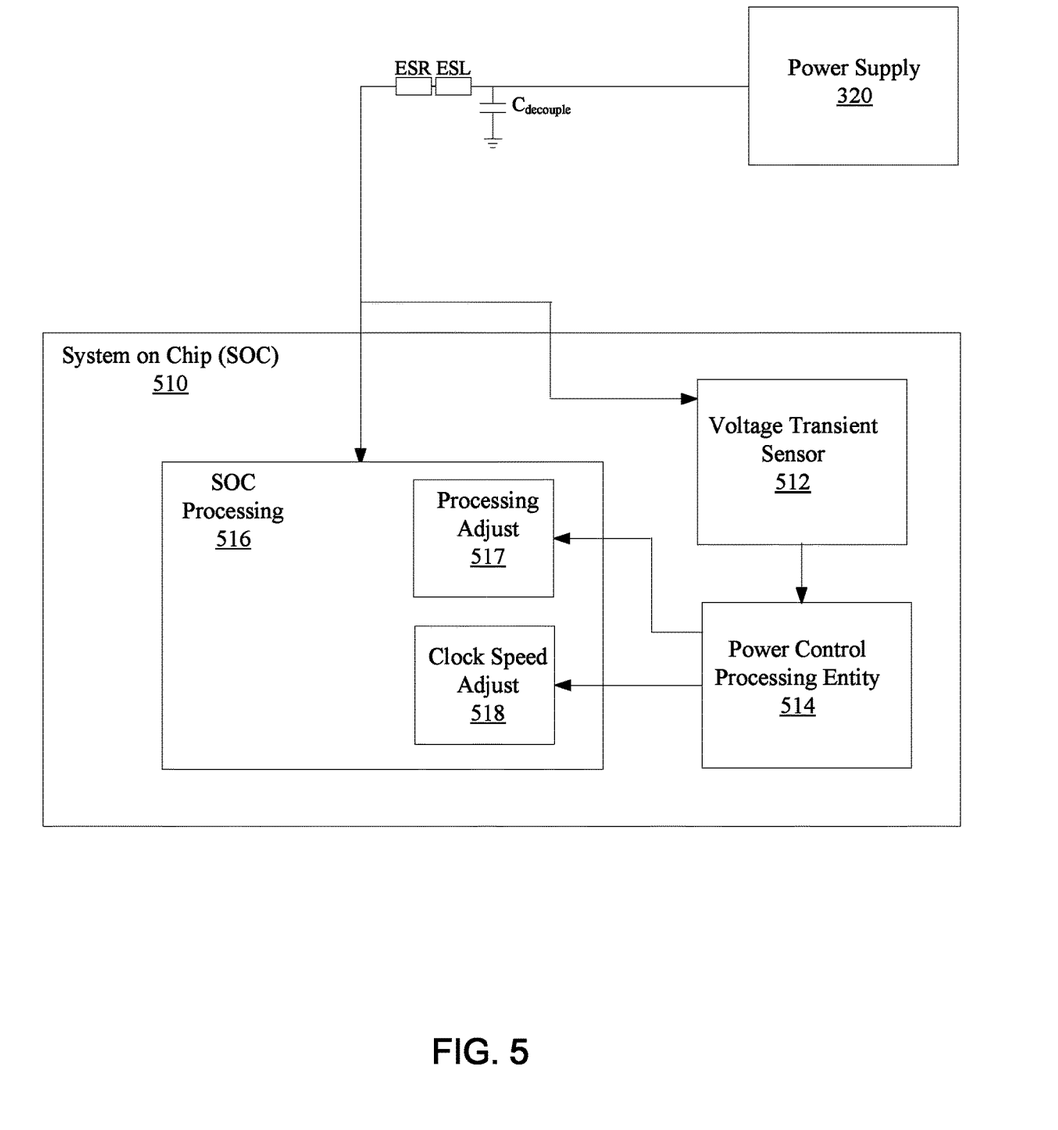
FIG. 5 shows a system for sensing voltage transients of a power supply of a system on a chip (SOC), according to an embodiment.

FIG. 5 shows a system for sensing voltage transients of a power supply 320 of a system on a chip (SOC) 510, according to an embodiment. A voltage transient sensor 512 senses transients of the voltage supply 320 near a power supply input to the SOC or within the SOC. The voltage transient sensor is operative to sense voltage transients on the power supply at greater than a predetermined speed or rate. A power control processing entity 514 receives the sensed transients of the power supply 320 and accordingly adjusts SOC processing 516. As previously described, fir an embodiment, the power control processing entity 514 adjusts the power consumed by the SOC 510 by at least a processing adjustment 517 or a clock speed adjustment 518 (also referred to as frequency scaling) of the SOC processing 516.

For at least some embodiments, the power control processing is based purely on measurement of the voltage (measured voltage transients) at the bumps (solder bumps of a surface mount integrated circuit) of the SOC or within the die of the SOC. In contrast with the system of FIG. 3, the current sensing and conditioning are eliminated.

For at least some embodiments, the voltage transient sensor 512 operates at a fast enough speed to allow the voltage transient sensor 512 to properly sense (monitor) the voltage transients of the power supply. The voltage transients (such voltage drops) are generated, for example, when a heavy software load is operating on the SOC 510. The heavy software load can cause a substantial change in processing power which can induce the voltage transients. For an embodiment, voltage drops (voltage transients) caused by rapid increases in the processing power of the SOC can be monitored using voltage monitoring ADCs. The monitored voltage can be used to scale a frequency of a software clock, or to adjust the processing of the SOC. For an embodiment, a voltage monitoring feedback loop responds fast enough that dangerous voltage transients can be mitigated.

For an embodiment, the power control processing entity 514 operates to adjust the power load of the SOC by adjusting processing of the one or more processors of the SOC processing 516.

For an embodiment, the predetermined speed or rate is selected to be faster than a speed or rate in which the power supply can change. For an embodiment, the term power supply includes not only the power supply, but also an associated PDN, and decoupling capacitors. For an embodiment, a speed of the sensing is much faster than a speed of the power supply so the otherwise dangerous transient will not be sensed. For an embodiment, the speed of power supply is a speed at which the power supply reacts to a change in load. For an embodiment, the power supply is a switching power supply, and the speed of the power supply is the speed at which the output voltage of the power supply can change. That is, different configurations of power supplies may provide different rates in which the output voltage of the power supply can change over time. For an embodiment, the rate or speed in which the voltage transient sensor(s) are able to sense changes is matched with the power supply. The faster the power supply is able to change its output voltage, the faster the transient sensor is configured to sense changes in the output voltage. This can include, for example, selection of a sampling rate of an ADC within the transient sensor based on the rate in which the output voltage of the power supply can change.

It is important to choose sampling frequency as well as number of samples needed for decision on load scaling in a way that voltage will not fall below $V_{fail}$, which is a voltage where operation of the system is no longer guaranteed. Several considerations can be included in the determination of the sampling rate. For example, as previously described, the rate (change in voltage over time) that the power supply is able to change can be an influencing factor in the selection of the sampling rate.

Sampling Rate

For an embodiment, the sampling rate is selected to be fast enough to detect the voltage transient of the power supply and to provide enough time for the power scaling mechanism to scale the SOC power. For an embodiment, the sampling rate is selected based on expected transients for the particular power supply design of the power supply. Power supply design consideration include the power distribution network, decoupling capacitors, and voltage regulator parameters that can be accounted for through experimentation and simulation.

Amplitude of Voltage Transients

For an embodiment, voltage transient sensor samples indicating an output voltage below or equal to $V_{crit}$ are classified as dangerous and indicate the power scaling (reduction) of the SOC is needed. For an embodiment, having established $V_{crit}$ as the voltage threshold indicating that the power regulator will not be able to keep up with the voltage transient, several samples are monitored to determine if the samples are below the $V_{crit}$.

Adaptive Power Control

For an embodiment, as previously described, various levels of $V_{crit}$ are identified or selected. For an embodiment, $V_{crit}$ is identified as an indicator of a problematic situation. For an embodiment, $V_{crit}$ has a plurality of different levels representing how aggressive the transient is and how aggressive the scaling needs to be. For an embodiment, this relates to the amplitude of the transient. However, for an embodiment, the speed of transients is also a source of information about "seriousness" of the transients. For an embodiment, the power scaling of the SOC is based on an amplitude of the sensed transients. For an embodiment, the power scaling of the SOC is based on a speed (rate of change over time) of the sensed transients. For an embodiment, the power scaling of the SOC is based on the amplitude and speed of the sensed transients.

For an embodiment, the choice of $V_{crit}$ and $V_{fail}$ as well as frequency of sampling and number of samples shall be established per circuit taking into account capabilities of the system, quality of the PDN, speed of power regulator, and a reaction time of the over current protection of the regulator.

Too great a load will cause the power supply to switch to an over-current protection mode. Further, AI processing can stress the power supply due to non-anticipated power demands.

For an embodiment, the predetermined speed or rate is determined by simulation or testing of the SOC over different operating conditions.

For an embodiment, the voltage transient sensor operates at greater than the predetermined speed or rate by being connected to the power supply within the SOC. For an embodiment, the voltage transient sensor operates at greater than the predetermined speed or rate by selection of a voltage analog-to-digital converter (ADC)) that operates at greater than the predetermined speed or rate. For an embodiment, the ADC is located within the SOC. Locating the ADC within the SOC can improve the operating speed of the system by reducing parasitic capacitances and inductances.

For an embodiment, the voltage transient sensor senses voltage transients on the power supply at greater than the predetermined speed or rate by sensing a plurality of samples of the power supply at a rate great enough to sense the voltage transients on the power supply at greater than the predetermined speed or rate.

For an embodiment, the voltage transient sensor senses voltage transients on the power supply at greater than the predetermined speed or rate by sensing a voltage of the power supply a plurality of times (several samples) to determine a rate of change of the voltage of the power supply of greater than a threshold amount. Further, for an embodiment, the consecutive samples are used to detect where voltage is going over time. That is, the change in voltage over samples is used to extrapolate future voltages over time.

It is to be understood that for at least some embodiments, the methods, apparatuses, and systems for adaptive power supply voltage transient protection do not replace slow power monitoring for thermal purposes. Rather, the described embodiments provide help to cope with unpredicted software algorithms or help in the situations where power monitoring is too slow to prevent power issues.

Figure 6:
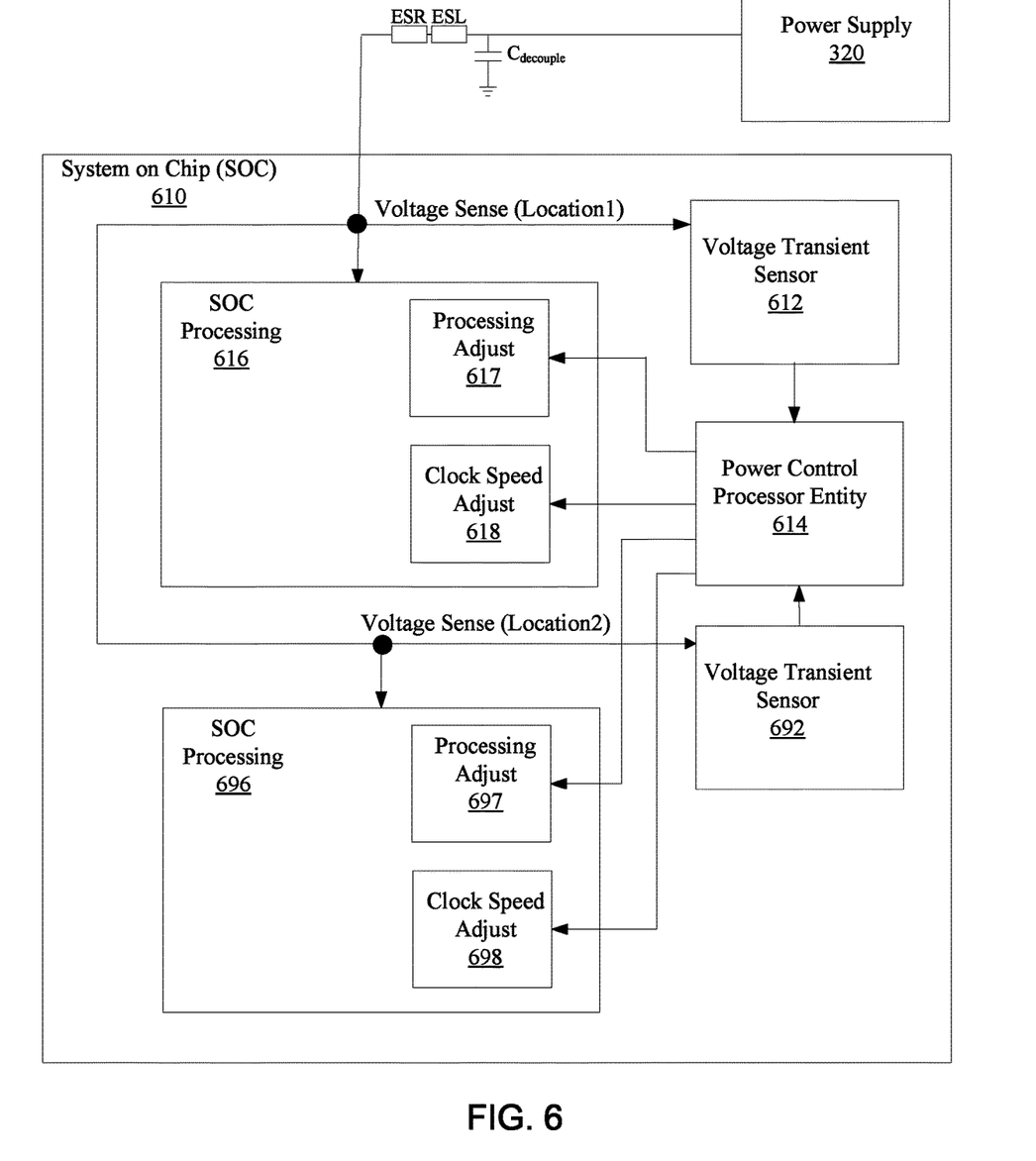
FIG. 6 shows a system for sensing voltage transients of a plurality of power supply locations of a system on a chip (SOC), according to an embodiment.

FIG. 6 shows a system for sensing voltage transients of a plurality of power supply locations (voltage sense location 1, and voltage sense location 2) of a system on a chip (SOC) 610, according to an embodiment. A power supply rail connected to the power supply 320 can be routed to different locations (such as, Location1 and Location2) of the SOC 610. For an embodiment, separate voltage transient sensor 612, 692 senses voltage transients at the different sensed locations (voltage sense (Location1), and voltage sense (Location2)). Further, for an embodiment, each of the voltage transient sensors 612, 692 are used by a power control entity 614 to control the processing of different SOC processing adjusted basing on different sensors in different locations SOC processing 616, 696. Further, for an embodiment, each of the voltage transient sensors 612, 692 are used by a power control entity 614 to control the processing of common processing within the SOC 610. For an embodiment, the power control processing entity 614 adjusts the power consumed by the SOC 610 for the different SOC processing 616, 696 by at least processing adjustments 617, 697 or clock speed adjustments 618, 698 (also referred to as frequency scaling) of the SOC different SOC processing 616, 696.

For at least some embodiments, the power control processing entity her operative to receive a digital representation of the sensed voltage transients from each of the plurality of voltage transient sensors 612, 692 and adjust a power load of different portions 616, 696 of the SOC 610 based on the sensed voltage transients of each of the plurality of voltage transient sensors.

In AI processing different power consumption by the SOC can be attributed to certain parts of an AI processor. For an embodiment, either the processor can be subdivided into functional blocks representing distinctive processing parts characterized with different power consumption or certain parts of indivisible processing parts can be characterized with physical locations of different power demands. For an embodiment, the transient sensors are located in a plurality of locations, wherein each location represents distinctive processing parts or placing them in a number of locations of indivisible processing parts. For an embodiment, the power control entity receives a number of signals representing voltage transients in different parts of the AI processor (SOC) and works out with greater accuracy and quite often faster the dangerous condition. This results in scaling the processing load more effectively. The voltage transients sensed by different sensors (attributed to different locations within the SOC or to different SOCs) might be attributed to different processing, thereby providing more representative information about level of power used by the chip.

For an embodiment, time correlation of processing of the SOC with the sensing of voltage transients can be used to identify what processing is causing the voltage transients. That is, there can be multiple processing operations performed within the processing of the SOC. The starting and stopping of different operations of the multiple processing can be time correlated with sensing of voltage transients by one or more of the plurality of voltage transient sensors. Accordingly, upon being time correlated, correlated processing can be power scaled upon the sensing of voltage transients of one or more of the voltage transient sensors.

Further, for at least some embodiments, the power control processing entity 614 operating to adjust a power load of different portions 616, 696 of the SOC 610 based on the sensed voltage transients of each of the plurality of voltage transient sensors includes the power control processing entity 614 operating to adjust processing of different of a plurality of power control processing entities within the SOC 610 based on which of the plurality of voltage transient sensors 612, 692 senses voltage transients of greater than the predetermined speed or rate. That is, multiple different portions 616, 696 of the SOC 610 can be adjusted, or each of the different portions 616, 696 of the SOC 610 may be adjusted based on which of the voltage transient sensors 612, 692 senses voltage transients of greater than the predetermined speed or rate.

Figure 7:
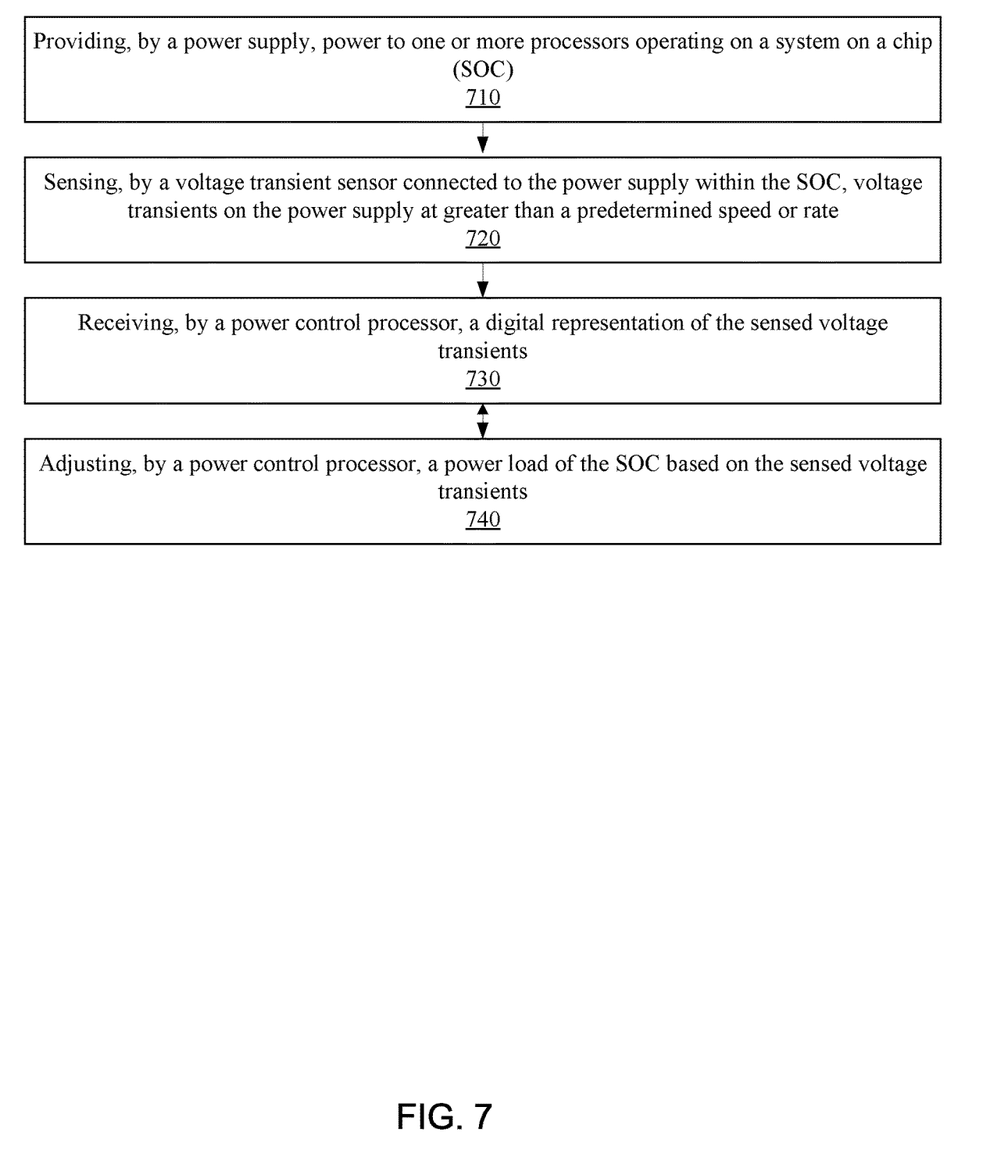
FIG. 7 is a flow chart that includes steps of a method for sensing transients of a power supply of a system on a chip (SOC), according to an embodiment.

FIG. 7 is a flow chart that includes steps of a method for sensing transients of a power supply of a system on a chip (SOC), according to an embodiment. A first step 710 includes providing, by a power supply, power to one or more processors operating on a system on a chip (SOC). A second step 720 includes sensing, by a voltage transient sensor connected to the power supply, voltage transients on the power supply at greater than a predetermined speed or rate. A third step 730 includes receiving, by a power control processor, a digital representation of the sensed voltage transients. A fourth step 740 includes adjusting, by a power control processor, a power load of the SOC based on the sensed voltage transients.

As previously described, at least some embodiments further include sensing, by a plurality of voltage transient sensors, voltage transients at different locations associated with the SOC.

As previously described, for at least some embodiments, the power control processing entity further operative to receiving a digital representation of the sensed voltage transients from each of the plurality of voltage transient sensors, and adjusting a power load of different portions of the SOC based on the sensed voltage transients of each of the plurality of voltage transient sensors. For an embodiment, adjusting, by the power control processing entity, a power load of different portions of the SOC based on the sensed voltage transients of each of the plurality of voltage transient sensors includes adjusting, by the power control processing, processing of different of a plurality of power control processing entities within the SOC based on which of the plurality of voltage transient sensors senses voltage transients of greater than the predetermined speed or rate. Further, for an embodiment, the power control processing entity operating to adjust a power load of different portions of the SOC based on the sensed voltage transients of each of the plurality of voltage transient sensors comprises the power control processing entity operating to adjust processing of different of a plurality of power control processing entities within the SOC based on time correlating which of the plurality of voltage transient sensors senses voltage transients of greater than the predetermined speed or rate with processing of the SOC. That is, the processing of the SOC may be partitioned into a plurality of identifiable portions. By time correlating the sensed voltage transients with one or more of the plurality of identifiable portions of the processing, which of the plurality of portions that is causing the sensed voltage transients can be identified. Once identified, the processing of the identified portions can be adjusted to mitigate the processing power of the identified portions, which reduces or eliminates the sensed voltage transients.

As previously described, for at for least some embodiments, the predetermined speed or rate is selected to be faster than a speed or rate in which the power supply can change. For an embodiment, a speed of the sensing is much faster than a speed of the power supply so the otherwise dangerous transient will not occur. For an embodiment, the speed of power supply is a speed at which the power supply reacts to a change in load. For an embodiment, the power supply is a switching power supply, and the speed of the power supply is the speed at which the output voltage of the power supply can change.

As previously described, for at least some embodiments, the voltage transient sensor operates at greater than the predetermined speed or rate by being connected to the power supply within the SOC.

As previously described, for at least some embodiments, the voltage transient sensor operates at greater than the predetermined speed or rate by selection of a voltage analog-to-digital converter (ADC)) that operates at greater than the predetermined speed or rate. For an embodiment, the ADC is located within the SOC. Locating the ADC within the SOC can improve the operating speed of the ADC by reducing parasitic capacitances and inductances.

As previously described, for at least some embodiments, the voltage transient sensor senses voltage transients on the power supply at greater than the predetermined speed or rate by sensing a plurality of samples of the power supply at a rate great enough to sense the voltage transients on the power supply at greater than the predetermined speed or rate.

As previously described, for at least some embodiments, the voltage transient sensor operates to sense a plurality of different relative amplitude of the voltage transients on the power supply. Further, the power control processing entity operates to receive a digital representation of the sensed plurality of different relative amplitudes of the voltage transients, and adaptively adjust the power load of the SOC by different amounts based on the sensed plurality of different relative amplitudes of the voltage transients. As shown in FIG. 4B, different sensed levels of the amplitude of the voltage transients can be used to adaptively adjust the power load of the SOC.

Although specific embodiments have been described and illustrated, the described embodiments are not to be limited to the specific forms or arrangements of parts so described and illustrated. The embodiments are limited only by the appended claims.

What is claimed:

1. A system on a chip (SOC), comprising:
   a power supply operative to provide power to one or more processors operating on the SOC;
   a voltage transient sensor connected to the power supply, the voltage transient sensor operative to sense voltage transients on the power supply at greater than a predetermined speed or rate;
   a power control processing entity operative to:
      receive a digital representation of the sensed voltage transients; and
      adjust a power load of the SOC based on the sensed voltage transients.

2. The SOC of claim 1, wherein the power control processing entity operates to adjust the power load of the SOC by adjusting processing of the one or more processors.

3. The SOC of claim 1, further comprising a plurality of voltage transient sensors, each voltage transient sensor sensing voltage transients at different locations associated with the SOC.

4. The SOC of claim 3, wherein the power control processing entity is further operative to:
   receive a digital representation of the sensed voltage transients from each of the plurality of voltage transient sensors; and
   adjust a power load of different portions of the SOC based on the sensed voltage transients of each of the plurality of voltage transient sensors.

5. The SOC of claim 4, wherein the power control processing entity operating to adjust a power load of different portions of the SOC based on the sensed voltage transients of each of the plurality of voltage transient sensors comprises the power control processing entity operating to adjust processing of the one or more processors operating on the SOC based on which of the plurality of voltage transient sensors senses voltage transients of greater than the predetermined speed or rate.

6. The SOC of claim 4, wherein the power control processing entity operating to adjust a power load of different portions of the SOC based on the sensed voltage transients of each of the plurality of voltage transient sensors comprises the power control processing entity operating to adjust processing of the one or more processors operating on the SOC based on time correlating which of the plurality of voltage transient sensors senses voltage transients of greater than the predetermined speed or rate with processing of the SOC.

7. The SOC of claim 1, wherein the predetermined speed or rate is selected to be faster than a speed or rate in which the power supply can change.

8. The SOC of claim 1, wherein the predetermined speed or rate is determined by simulation or testing of the SOC over different operating conditions.

9. The SOC of claim 1, wherein the voltage transient sensor operates at greater than the predetermined speed or rate by selection of a voltage analog-to-digital converter (ADC)) that operates at greater than the predetermined speed or rate.

10. The SOC of claim 1, wherein the voltage transient sensor senses voltage transients on the power supply at greater than the predetermined speed or rate by sensing a plurality of samples of the power supply at a rate great enough to sense the voltage transients on the power supply at greater than the predetermined speed or rate.

11. The SOC of claim 1, wherein the voltage transient sensor senses voltage transients on the power supply at greater than the predetermined speed or rate by sensing a voltage of the power supply a plurality of times resulting in several samples to determine a rate of change of the voltage of the power supply of greater than a threshold amount.

12. The SOC of claim 1, wherein the voltage transient sensor operates to sense a plurality of different relative amplitude of the voltage transients on the power supply;
and wherein the power control processing entity operates to:
receive a digital representation of the sensed plurality of different relative amplitudes of the voltage transients; and
adaptively adjust the power load of the SOC by different amounts based on the sensed plurality of different relative amplitudes of the voltage transients.

13. A method comprising:
providing, by a power supply, power to one or more processors operating on a system on a chip (SOC);
sensing, by a voltage transient sensor connected to the power supply, voltage transients on the power supply at greater than a predetermined speed or rate;
receiving, by a power control processor, a digital representation of the sensed voltage transients; and
adjusting, by the power control processor, a power load of the SOC based on the sensed voltage transients.

14. The method of claim 13, further comprising:
sensing, by a plurality of voltage transient sensors, voltage transients at different locations associated with the SOC.

15. The method of claim 14, further comprising:
receiving, by the power control processor, a digital representation of the sensed voltage transients from each of the plurality of voltage transient sensors; and
adjusting a power load of different portions of the SOC based on the sensed voltage transients of each of the plurality of voltage transient sensors.

16. The method of claim 15, wherein adjusting, by the power control processor, a power load of different portions of the SOC based on the sensed voltage transients of each of the plurality of voltage transient sensors comprises:
adjusting, by the power control processor, processing of the one or more processors operating on the SOC based on which of the plurality of voltage transient sensors senses voltage transients of greater than the predetermined speed or rate.

17. The method of claim 13, wherein the predetermined speed or rate is selected to be faster than a speed or rate in which the power supply can change.

18. The method of claim 13, wherein the voltage transient sensor operates at greater than the predetermined speed or rate by being connected to the power supply within the SOC.

19. The method of claim 13, wherein the voltage transient sensor operates at greater than the predetermined speed or rate by selection of a voltage analog-to-digital converter (ADC)) that operates at greater than the predetermined speed or rate.

20. The method of claim 13, wherein the voltage transient sensor senses voltage transients on the power supply at greater than the predetermined speed or rate by sensing a plurality of samples of the power supply at a rate great enough to sense the voltage transients on the power supply at greater than the predetermined speed or rate.

* * * * *